US011881196B2

(12) United States Patent
Sakata

(10) Patent No.: US 11,881,196 B2
(45) Date of Patent: Jan. 23, 2024

(54) ELECTRONIC KEYBOARD MUSICAL INSTRUMENT AND METHOD OF GENERATING MUSICAL SOUND

(71) Applicant: CASIO COMPUTER CO., LTD., Tokyo (JP)

(72) Inventor: Goro Sakata, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 400 days.

(21) Appl. No.: 17/191,916

(22) Filed: Mar. 4, 2021

(65) Prior Publication Data

US 2021/0295806 A1 Sep. 23, 2021

(30) Foreign Application Priority Data

Mar. 17, 2020 (JP) ................................. 2020-046437

(51) Int. Cl.

*G10H 1/053* (2006.01)
*G10H 1/00* (2006.01)

(Continued)

(52) U.S. Cl.

CPC ........... *G10H 1/053* (2013.01); *G10H 1/0091* (2013.01); *G10H 1/08* (2013.01); *G10H 1/125* (2013.01);

(Continued)

(58) Field of Classification Search

CPC ........ G10H 1/053; G10H 1/0091; G10H 1/08; G10H 1/125; G10H 1/346; G10H 2210/271

(Continued)

(56) References Cited

U.S. PATENT DOCUMENTS 5,468,906 A * 11/1995 Colvin, Sr. ............ G10H 5/007 84/625
5,496,964 A * 3/1996 Suzuki ................... G10H 5/007 84/661

(Continued)

FOREIGN PATENT DOCUMENTS

CN 1039368 C * 7/1998 ............... G10H 1/24
JP H04-204599 A 7/1992

(Continued)

OTHER PUBLICATIONS

Notice of Reasons for Refusal dated Jul. 19, 2022 received in Japanese Patent Application No. JP 2020-046437.

(Continued)

*Primary Examiner* — Christina M Schreiber
(74) *Attorney, Agent, or Firm* — Scully, Scott, Murphy & Presser, P.C.

(57) ABSTRACT

An electronic keyboard musical instrument includes a sound source configured to, in response to detection of key-pressing of the first key in damper-off detection, input first excitation signal data corresponding to the first key to a first channel, input first channel output data which is output from the first channel to each of low-register channels corresponding to the respective low-register keys, and output musical sound data which is generated based on respective pieces of low-register channel output data which is output from the respective low-register channels and the first channel output data, as musical sound data corresponding to the first key.

12 Claims, 12 Drawing Sheets

(51) Int. Cl.
*G10H 1/08* (2006.01)
*G10H 1/12* (2006.01)
*G10H 1/34* (2006.01)

(52) U.S. Cl.
CPC ....... *G10H 1/346* (2013.01); *G10H 2210/271* (2013.01)

(58) Field of Classification Search
USPC .......................................................... 84/622
See application file for complete search history.

(56) References Cited

U.S. PATENT DOCUMENTS

| | | | | |
|---|---|---|---|---|
| 9,478,203 | B2 | 10/2016 | Nakata | |
| 10,109,268 | B2 | 10/2018 | Sakata | |
| 2007/0175318 | A1* | 8/2007 | Izumisawa | G10H 1/0091 84/626 |
| 2012/0247306 | A1* | 10/2012 | Shimizu | G10H 5/007 84/616 |
| 2015/0221296 | A1* | 8/2015 | Nakata | G10H 1/06 84/725 |
| 2015/0269922 | A1* | 9/2015 | Matsunaga | G10H 7/00 84/605 |
| 2018/0182365 | A1* | 6/2018 | Sakata | G10H 1/125 |
| 2019/0341013 | A1* | 11/2019 | Liu | G10D 3/10 |
| 2019/0392799 | A1* | 12/2019 | Danjyo | G10H 7/004 |
| 2019/0392807 | A1* | 12/2019 | Danjyo | G10L 13/033 |
| 2021/0295806 | A1* | 9/2021 | Sakata | G10H 1/188 |
| 2021/0295807 | A1* | 9/2021 | Sakata | G10H 1/346 |
| 2022/0301530 | A1* | 9/2022 | Danjyo | G10H 1/06 |

FOREIGN PATENT DOCUMENTS

| | | | |
|---|---|---|---|
| JP | H06282271 | A | 10/1994 |
| JP | H09501513 | A | 2/1997 |
| JP | 2003-208182 | A | 7/2003 |
| JP | 2015-143764 | A | 8/2015 |
| JP | 2015-184309 | A | 10/2015 |
| JP | 2018-106007 | A | 7/2018 |

OTHER PUBLICATIONS

Extended European Search Report dated Aug. 10, 2021 received in European Patent Application No. EP 21158165.7.
Notice of Reasons for Refusal dated Jan. 17, 2023 received in Japanese Patent Application No. JP 2020-046437.

* cited by examiner

ELECTRONIC KEYBOARD MUSICAL INSTRUMENT AND METHOD OF GENERATING MUSICAL SOUND

CROSS-REFERENCE TO RELATED APPLICATIONS

This application is based upon and claims the benefit of priority from Japanese Patent Application No. 2020-046437, filed Mar. 17, 2020, the entire contents of which are incorporated herein by reference.

BACKGROUND OF THE INVENTION

1. Field of the Invention

The present invention relates to an electronic keyboard musical instrument and a method of generating a musical sound.

2. Description of the Related Art

A technique of a resonance sound generating apparatus capable of simulating resonance sound of an acoustic piano more faithfully has been proposed (for example, Jpn. Pat. Appln. KOKAI Publication No. 2015-143764).

SUMMARY OF THE INVENTION

According to one aspect of the present invention, there is provided an electronic keyboard musical instrument comprising: a keyboard including a first key and a plurality of low-register keys on a low register side; a processor; and a sound source, wherein the sound source is configured to, in response to detection of key-pressing of the first key in damper-off detection by the processor, execute processing of: inputting first excitation signal data corresponding to the first key to a first channel which corresponds to the first key, inputting first channel output data which is output from the first channel in response to input of the first excitation signal data to each of low-register channels corresponding to the respective low-register keys, and outputting musical sound data which is generated based on respective pieces of low-register channel output data which is output from the respective low-register channels in response to the input of the first channel output data and the first channel output data output from the first channel, as musical sound data corresponding to the first key.

According to the present invention, it is possible to generate good damper resonance.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment in the case where the present invention is applied to an electronic keyboard musical instrument will be described with reference to drawings.

[Configuration]

Figure 1:
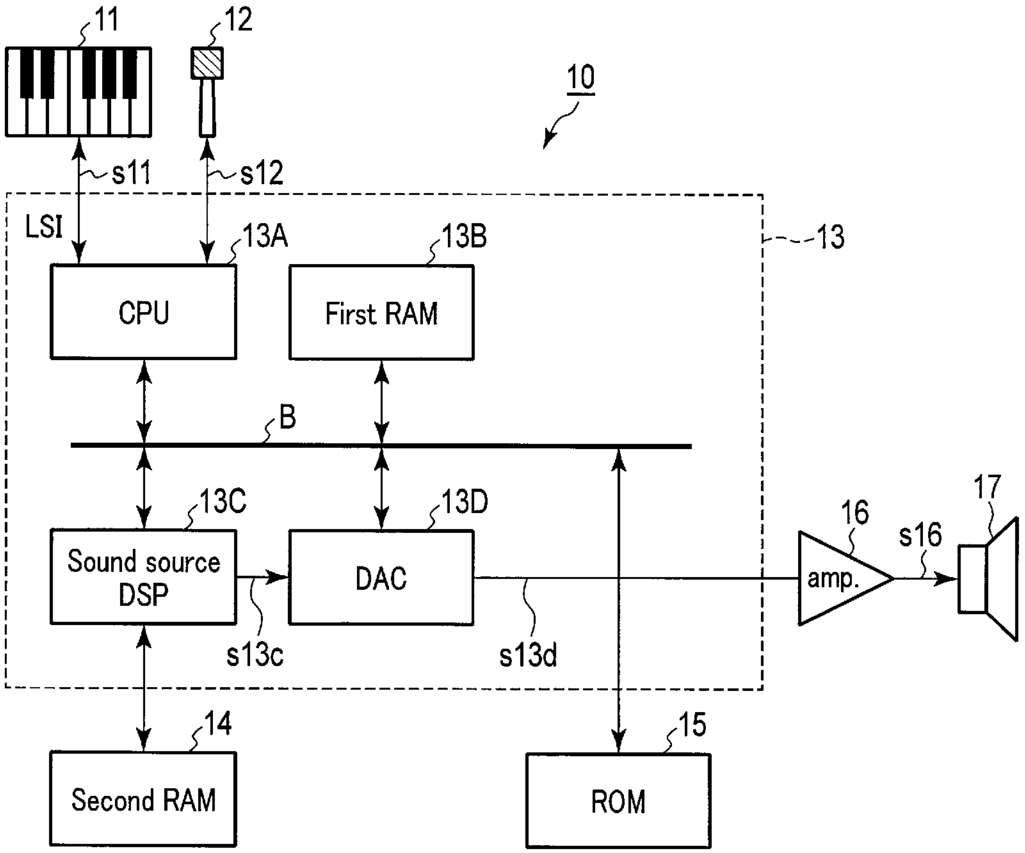
FIG. 1 is a block diagram showing the configuration of a basic hardware circuit of an electronic keyboard musical instrument according to an embodiment of the present invention.

FIG. 1 is a block diagram showing the configuration of a basic hardware circuit in the case where the present embodiment is applied to an electronic keyboard musical instrument 10. In the same figure, an operation signal s11 including a note number (pitch information) and a velocity value (key-pressing speed) as sound volume information, which is generated according to the operation at a keyboard 11 serving as playing operators, and a damper-on/off operation signal s12, which is generated according to the operation at a damper pedal 12, are input in CPU 13A of a LSI 13.

The LSI 13 connects, via a bus B, the CPU 13A, a first RAM 13B, a sound source DSP (digital signal processor) 13C, and a D/A converting unit (DAC) 13D.

The sound source DSP 13C is connected with a second RAM 14 outside the LSI 13. The bus B is also connected with a ROM 15 outside the LSI 13.

The CPU 13A controls overall operations of the electronic keyboard musical instrument 10. The ROM 15 stores excitation signal data, etc. for operation programs or playing (music performance) performed by the CPU 13A. The first RAM 13B functions as a buffer memory for delaying a signal generating musical sound, such as a closed loop circuit.

The second RAM 14 is a work memory in which the sound source DSP 13C develops and stores an operation program. The CPU 13A gives a parameter, such as a note number, a velocity value, and resonance parameters (resonance level indicating a level of damper resonance and/or a level of string resonance) accompanying a tone, to the sound source DSP 13C during the playing operation.

The sound source DSP 13C reads an operation program and/or fixed data stored in the ROM 15, develops and stores them in the second RAM 14 serving as the work memory, and executes the operation program. Specifically, in response to the parameter given from the CPU 13A, the sound source DSP 13C reads necessary excitation signal data to generate string sound from the ROM 15, adds the excitation signal data to the processing in the closed loop circuit, synthesizes output data of a plurality of closed loop circuits, and generates signal data of string sound.

The sound source DSP 13C also reads signal data of stroke sound different from string sound from the ROM 15, and generates output data acquired by regulating amplitude and sound quality in accordance with velocity for each of channels assigned to the notes to be generated.

In addition, the sound source DSP 13C synthesizes pieces of generated output data of the string sound and the stroke sound, and outputs the synthesized musical sound data s13C to the D/A converting unit 13D.

The D/A converting unit 13D converts the musical sound data s13C into an analog signal (s13*d*), and outputs the analog signal to an amplifier (amp.) 16 outside the LSI 13. With an analog musical sound signal s16 amplified with the amplifier 16, a speaker 17 speech-amplifies and emits musical sound.

The hardware circuit configuration illustrated in FIG. 1 may be achieved with software. When the configuration is achieved with a personal computer (PC), the functional hardware circuit configuration is different from the details illustrated in FIG. 1.

Figure 2:
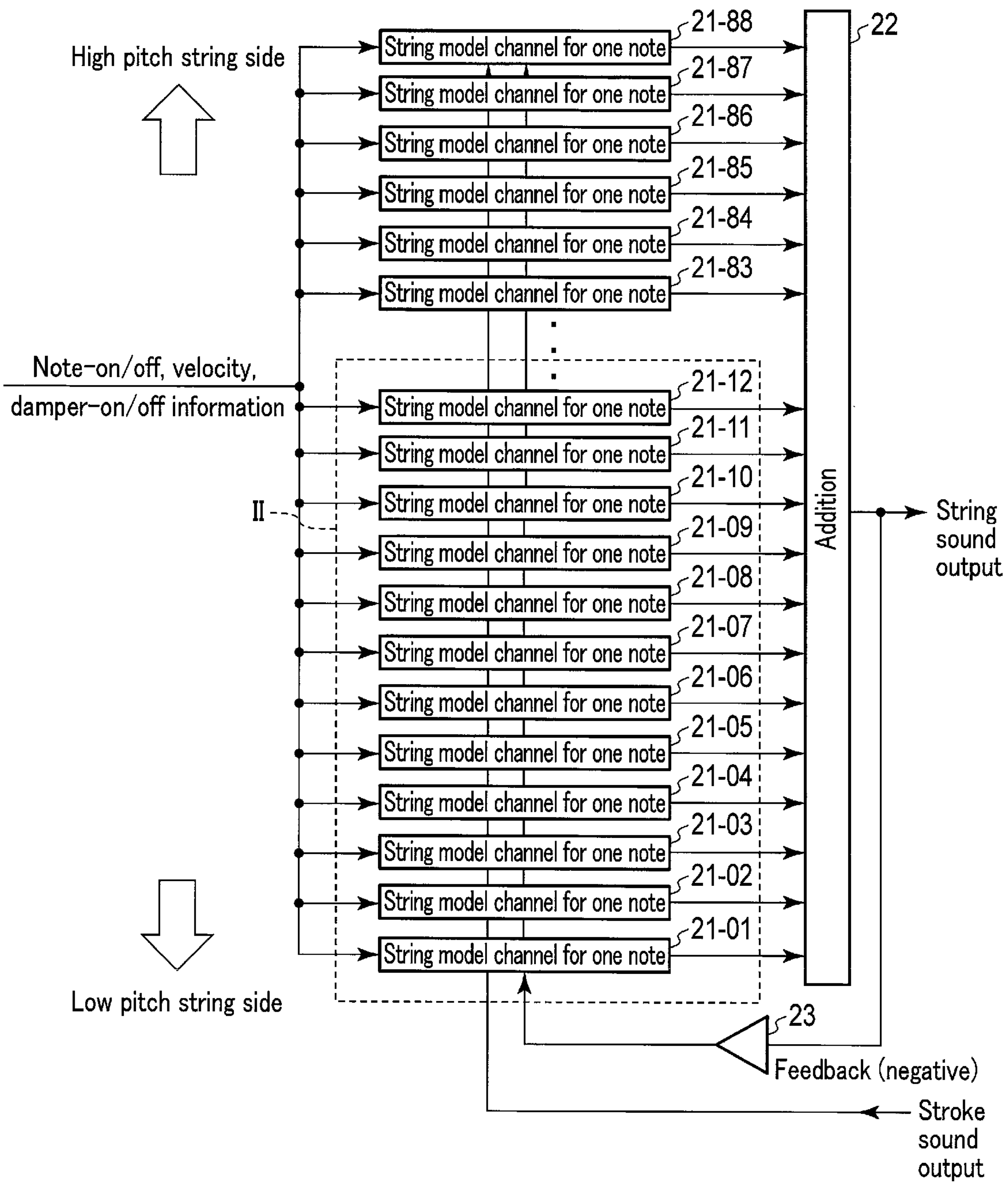
FIG. 2 is a block diagram showing the configuration of a whole sound source channel generating string sound according to the embodiment.

FIG. 2 is a block diagram illustrating the principle conceptual configuration of the whole sound source channels of string sound with the sound source DSP 13C in which channel assignment by dynamic assignment is not adopted.

A control signal is provided to string model channels (CH) 21-01 to 21-88 corresponding to 88 keys (notes) of an ordinary piano and performing closed loop processing for 88 notes. The control signal is formed of various information, such as note on/off information, velocity information, and damper-on/off information. In FIG. 2, suppose that the channel located on the lower side in the drawing is a channel for low-pitched sound, and the channel located on the upper side in the drawing is a channel for high-pitched sound.

In this example, each model channel is a model channel including three strings (medium register and high register) (one string or two strings in a low register) for one note of a piano.

In the string model channels 21-01 to 21-88, channels set to a note-on state by key-pressing generate signal data with pitch and sound volume to be generated, and outputs thereof are added in an adder 22 and output as string sound output data.

The string sound output data output with the adder 22 is properly attenuated with an amplifier 23 for negative feedback, and fed back to each of the string model channels 21-01 to 21-88 to generate resonance sound.

In addition, stroke sound output data described later is fed back to each of the string model channels 21-01 to 21-88 in the same manner.

In the present embodiment, the stroke sound includes sound components, such as sound of collision generated when the hammer collides with string inside the piano by key-pressing, operating sound of the hammer, key-stroke sound by a finger of the piano player, and sound generated when the key hits on the stopper and stops, in an acoustic piano, and does not include components (basic sound component and harmonic tone component of each key) of pure string sound. The stroke sound is not always limited to physical stroke operation sound itself generated at key-pressing.

The string model channels 21-01 to 21-12 for one octave including 12 notes on the lowest pitch side and enclosed with a broken line II in FIG. 2 is supposed to be a note area generating string sound in damper-off in which the damper pedal 12 is trodden on.

To change the musical sound data acquired by synthesizing string sound output data and stroke sound output data into complete piano musical sound, as illustrated in FIG. 2, string sound output data and stroke sound output data are input to the string model to generate musical sound data as resonance sound. While the output string sound output data is subjected to feedback, the stroke sound output data is input in a feed-forward (series connection) manner, not feedback, because the stroke sound output data is generated as a PCM sound source. For this reason, the string sound output data and the stroke sound output data are different in path.

Because the stroke sound output data is input in a feed-forward structure, there is no necessity for taking measures against abnormal oscillation.

Input of the stroke sound output data to the string model channels 21-01 to 21-88 is basically performed at all the string model channels originally, but input may be performed only at the model channels on the lowest pitch side illustrated as the note area II in FIG. 2 in the present embodiment.

However, in consideration of the dynamic assignment method, adopting a structure capable of equally dealing with all the string model channels produces the merit of unifying the structure.

In addition, if the structure includes string model channels for 88 keys, it is unnecessary to adopt the dynamic assignment method, and the generated notes of the string model channels 21-01 to 21-88 can be stabilized as the structure of the static assignment method.

By contrast, when the number of string model channels is a number smaller than 88, for example, 32, the dynamic assignment method is adopted to dynamically assign the model channels of the number at most 32 in accordance with the provided note-on/off signals. In this case, as a matter of course, the musical sound for all the 88 notes cannot be simultaneously generated.

When a damper-off signal is generated with treading on the damper pedal 12, it is originally required to change the dampers of all the strings to an off state, and reproduce the easy resonance state.

In the present embodiment, when the damper-off signal is generated, the structure of partial static assignment method is adopted, and only the dampers of one octave of the lowest register are turned off to generate resonance sound of damper resonance.

Specifically, while the whole structure is the structure of the dynamic assignment system, when the damper-off signal is generated, 12 notes for one octave from the lowest note are successively assigned, and the dampers are turned off in the same manner to generate the damper resonance sound.

In this operation, when the key of the note corresponding to a note in one octave for the lowest register has already been pressed, because the note has already been changed to the damper-off state, the processing to change the note to a damper-off state is skipped. Because the state of the vacant channels changes according to the number of model channels and the note-on/off state of each of the keys, accurate damper resonance sound is not always generated in any state. However, by performing assignment successively from the low-pitched string, an operation is performed to enable generation of damper resonance sound with minimum resources. The processing control to achieve it will be described later.

The following is an explanation of the reason why damper resonance sound is acquired by damper-off processing only for one octave of the lowest pitch.

The reason why the damper resonance sound can be generated by damper-off for the limited note area from the lowest note, for example, for one octave, is that the low-pitched string includes all the harmonic tones of the higher notes. For example, the harmonic tone of A0 includes harmonic tones of the higher notes A1, A2, A3, . . . of the same sound name. For this reason, by performing damper-off for the lowest register for one octave, such as A0, A0 #, B0, C1, C1 #, . . . , G1, G1 #, the harmonic sound at the time of damper-off of all the notes can be generated. As a result, resonance sound close to sound in the case of performing damper-off for all the notes can be generated.

The following is an explanation of a difference in effect between the case of performing damper-off for all the strings and the case of performing damper-off for one octave of the lowest register.

Due to inharmonicity (shift of frequency of harmonic tone due to inharmonicity, the phenomenon in which the frequency of harmonic tone departs from multiples of the frequency) and stretch tune (ordinary tuning method of generating a piano sound in harmony with inharmonicity by tuning high sound higher and low sound lower), the multiplication of the frequencies in a relation of harmonic sound and/or octave does not become an accurate integer. For this reason, the resonance sound generated for all the strings is exactly different from the resonance sound generated by damper-off processing for one octave of the lowest register. However, because their frequency component characteristics forming the harmonic tones are close to each other and the number of harmonic tones is very large, the sound quality is sufficient, and it is difficult for the user of the electronic musical instrument to perceive the difference.

Figure 3:
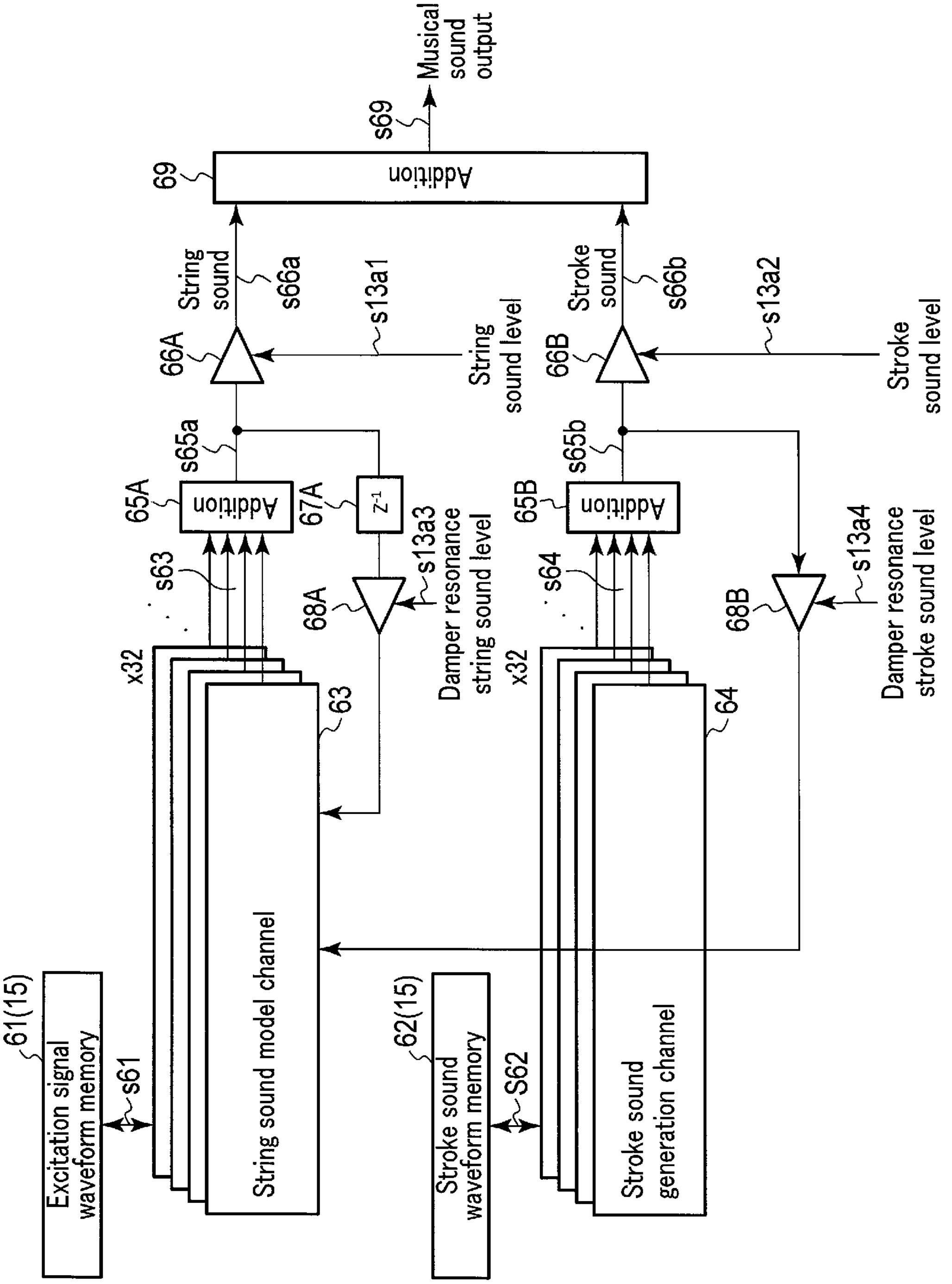
FIG. 3 is a block diagram showing the functional configuration at an implementation level generating musical sound data from channel output data of string sound and stroke sound at the implementation level according to the embodiment.

FIG. 3 is a block diagram showing the functional configuration at an implementation level with the sound source DSP 13C to generate musical sound data from channel output data of string sound and stroke sound in the dynamic assignment method.

To change the musical sound acquired by synthesizing the string sound and the stroke sound into complete piano musical sound, a plurality of channels are provided for each of the string sound and the stroke sound, for example, 32 channels for each.

Specifically, string sound excitation signal data s61 is read out of an excitation signal waveform memory 61 in response to a note-on signal, and string sound channel output data s63 is generated by closed loop processing at each of string sound model channels 63 formed of 32 channels at most, and output to an adder 65A. An addition result synthesized at the adder 65A is output as string sound output data s65*a*, attenuated with an amplifier 66A in accordance with the string sound level transmitted from the CPU 13A, and thereafter input to an adder 69.

In addition, the string sound output data s65*a* output from the adder 65A is delayed with a delay retaining unit 67A by one sampling cycle (Z−1), attenuated with an amplifier 68A in accordance with the damper resonance string sound level from the CPU 13A, and fed back to the string sound model channels 63.

By contrast, stroke sound signal data s62 is read out of a stroke sound waveform memory 62 in response to a note-on signal, and stroke sound channel output data s64 is generated at each of stroke sound model channels 64 formed of 32 channels at most, and output to an adder 65B. An addition result synthesized at the adder 65B is output as stroke sound output data s65*b*, attenuated with an amplifier 66B in accordance with the stroke sound level transmitted from the CPU 13A, and thereafter input to the adder 69.

In addition, the stroke sound output data s65*b* output from the adder 65B is attenuated with an amplifier 68B in accordance with the damper resonance stroke sound level from the CPU 13A, and input to the string sound model channels 63.

The adder 69 synthesizes the string sound output data s66*a* input via the amplifier 66A with the stroke sound output data s66*b* input via the amplifier 66B by addition processing, and outputs synthesized musical sound data s69.

A string sound level signal s13*a*1 output from the CPU 13A to the amplifier 66A and designating the attenuation rate and a stroke sound level signal s13*a*2 output to the amplifier 66B and also designating the attenuation rate indicate the addition rate of the string sound to the stroke sound, and serve as parameters set according to the preset piano tone and/or the user's liking.

In addition, a damper resonance string sound level signal s13*a*3 output from the CPU 13A to the amplifier 68A and a damper resonance stroke sound level signal s13*a*4 output to the amplifier 68B are parameters that can be set differently from the string sound level signal and the stroke sound level signal described above.

This is because the sound generated as the main sound is generated through the whole structure, such as the bridge of the piano string, the soundboard, and the body, in an actual acoustic piano, and a difference in sound quality is generated from the resonance sound generated through the bridge serving as the main transmission path of resonance between the strings. For this reason, the structure enabling adjustment of the difference is adopted. Generally, the sound transmitted through the bridge transmission path is set such that the stroke sound component is set relatively large, and thereby the damper resonance sound can be generated as sound similar to sound of an acoustic piano.

In addition, when it is required to set the string resonance quantity generated at the time when the damper pedal 12 is not trodden on separately from the damper resonance quantity at the time when the damper pedal 12 is trodden on, control may be performed to change the levels of damper resonance (stroke sound and string sound) individually in accordance with the treading state of the damper pedal 12.

For example, in the case of resonance sound (string resonance) in a damper-on state in which the damper pedal 12 is not trodden on, because sound close to pure sound is generated as resonance sound, setting with relatively small stroke sound is possible. In addition, in the case of resonance sound (damper resonance) in a damper-off state in which the damper pedal 12 is trodden on, because sound excited with stroke sound and having a wide frequency band is generated as resonance sound, setting with relatively large stroke sound is possible.

Figure 4:
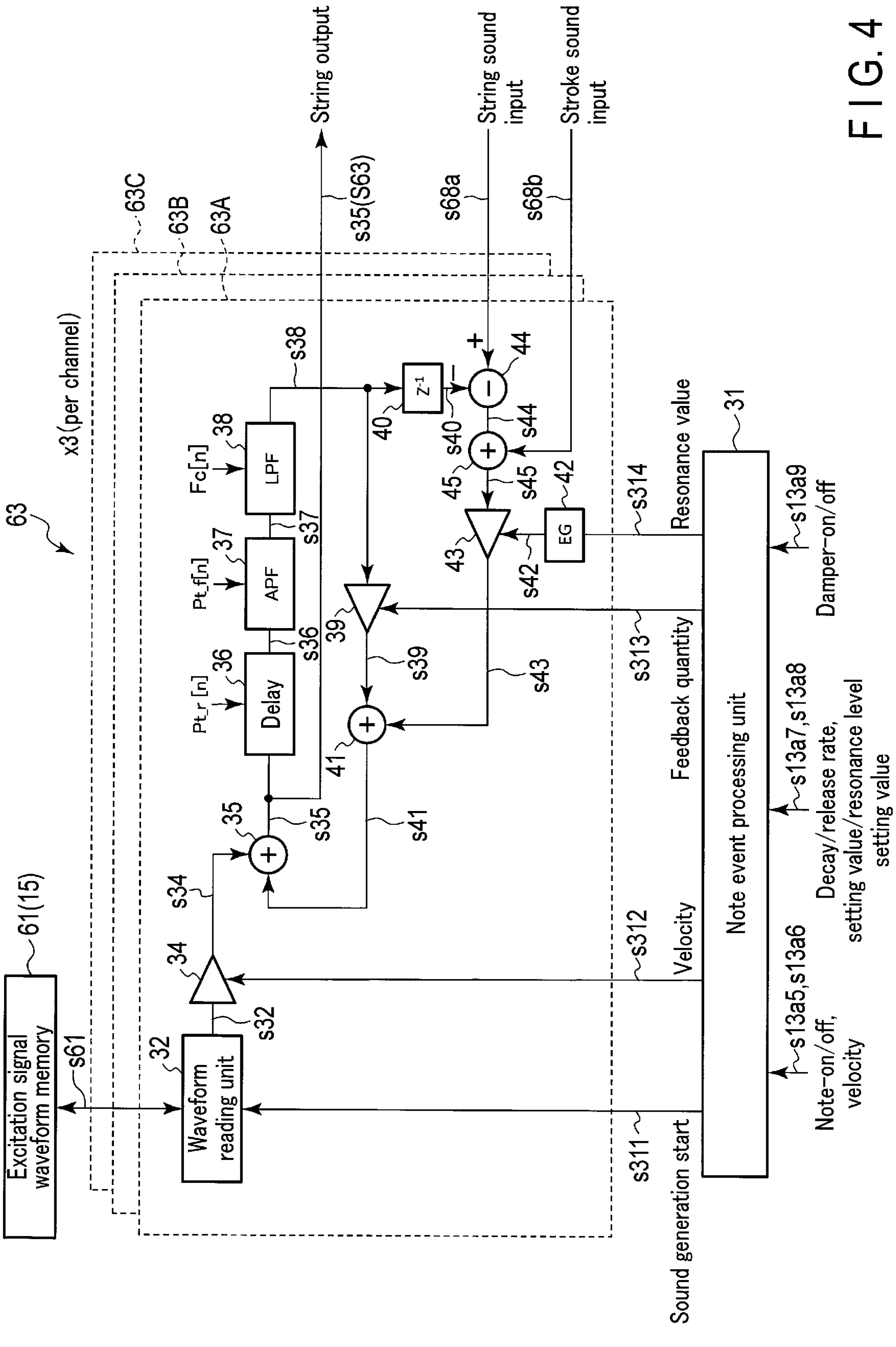
FIG. 4 is a block diagram mainly showing the detailed circuit configuration of a string sound model channel according to the embodiment.

FIG. 4 is a block diagram mainly showing the detailed circuit configuration of the string sound model channel 63 in FIG. 3. In FIG. 4, ranges 63A to 63C enclosed with broken lines in the drawing correspond to a channel, excluding a note event processing unit 31 described later and the excitation signal waveform memory 61 (ROM 15).

Specifically, the electronic keyboard musical instrument 10 is provided with a signal circulation circuit for one (lowest register), two (low register), or three (medium register and/or higher register) string models per key, in conformity with an actual acoustic piano. FIG. 4 illustrates the structure including a common signal circulation circuit corresponding to three string models by dynamic assignment correspondence.

The following explanation is made with an example of a string sound model channel 63A serving as one of signal circulation circuits of three string models.

The note event processing circuit 31 is provided with a note-on/off signal s13*a*5, a velocity signal s13*a*6, a decay (attenuation)/release (lingering sound) rate setting signal s13*a*7, a resonance level setting value signal s13*a*8, and a damper-on/off signal s13*a*9, from the CPU 13A. The note event processing circuit 31 transmits a sound generation start signal s311 to a waveform reading unit 32, a velocity signal s312 to an amplifier 34, a feedback quantity signal s313 to an amplifier 39, a resonance value signal s314 to an envelope generator (EG) 42, an integer part Pt_r [n] of string length delay in accordance with the pitch to a delay circuit 36, a decimal part of the string length delay to an all-pass filter (APF) 37, and a cut-off frequency Fc [n] to a low-pass filter (LPF) 38.

The waveform reading unit 32 that has received the sound generation start signal s311 from the note event processing unit 31 reads excitation signal data s61 having been subjected to window-multiplying processing from the excitation signal waveform memory 61, and outputs the excitation signal data s61 as signal s32 to the amplifier 34. The amplifier 34 regulates the level of the excitation signal data s61 with the attenuation quantity corresponding to the velocity signal s312 transmitted from the note event processing unit 31, and outputs the excitation signal data s61 to an adder 35.

The adder 35 is also provided with output data s41 acquired by adding the string sound and the stroke sound as a sum output from an adder 41. The adder 35 directly outputs a sum output acquired as a result of addition and serving as string sound channel output data s35 to the adder 65A of the subsequent stage, and also outputs the sum output to the delay circuit 36 forming a closed loop circuit.

In the delay circuit 36 of the acoustic piano, a string length delay Pt_r [n] has been set, with the note event processing unit 31, as a value according to an integer part of a single wavelength of sound output when the string vibrates (e.g., an integer "20" when the sound corresponds to a high note key, and an integer "2000" when the sound corresponds to a low note key), and the delay circuit 36 delays the channel output data s35 by only the string length delay Pt_f [n] and outputs the channel output data to the all-pass filter (APF) 37.

In the all-pass filter 37, a string length delay Pt_f [n] has been set as a value according to a decimal part of the single wavelength, and the all-pass filter 37 delays the output data s36 of the delay circuit 36 by only the string length delay Pt_f [n] and outputs the output data s36 to the low-pass filter (LPF) 38. That is, the output data is delayed, by the delay circuit 36 and the all-pass filter 37, for the time determined in accordance with the note number information (pitch information) (the time for a single wavelength).

The low-pass filter 38 passes the output data s37 on the low-frequency side of the all-pass filter 37 by using a cut-off frequency Fc [n] for wide band attenuation set for the frequency of the string length with the note event processing unit 31, and outputs the output data s37 to an amplifier 39 and a delay retaining unit 40.

The amplifier 39 attenuates the output data s38 from the low-pass filter 38 in accordance with the feedback quantity signal s313 provided from the note event processing unit 31, and thereafter outputs the output data s38 to the adder 41. The feedback quantity signal s313 is set in accordance with a value according to the rate of decay (attenuation) in the key-pressing state and the damper-off state, and set in accordance with a value according to the rate of release (lingering sound) in the non-key-pressing state and the damper-on state. The feedback quantity signal s313 is set smaller when the ratio of release (lingering sound) is high. In such a case, sound is attenuated early, and the degree of resonance of string sound becomes low.

The delay retaining unit 40 retains the waveform data output from the low-pass filter 38 only for one sampling cycle (Z−1), and outputs the waveform data to a subtracter 44 as a subtrahend.

The subtracter 44 is also provided with string data output data s68*a* for resonance sound of the previous sampling cycle and acquired by superimposing all the string models from the amplifier 68A. As the subtrahend, the subtracter 44 uses output data s40 for the string model itself. The output data s40 is output from the low-pass filter 38 and input via the delay retaining unit 40. The subtracter 44 outputs output data s44 serving as a difference between the output data s68*a* and the output data s40 to an adder 45.

The adder 45 is also provided with stroke sound output data s68*b* from the amplifier 68B, and supplies output data s45 serving as a sum output of addition of them to the amplifier 43. The amplifier 43 subjects the output data s45 to attenuation processing based on a signal 42 provided from the envelope generator 42 and indicating a sound volume according to the stage of ADSR (attach (rise)/Decay (attenuation)/Sustain (retaining after attenuation)/Release (lingering sound)) changing with a lapse of time according to the resonance value from the note event processing unit 31, and outputs attenuated output data s43 to the adder 41.

The adder 41 adds its string model output data s39 output from the amplifier 39 and the output data s43 output from the amplifier 43 with respect to the resonance sound of the whole string sound and the stroke sound, and supplies output data s41 serving as a sum output of them to the adder 35 to perform feedback input to the resonance sound closed loop circuit.

When the note-on signal s13*a*5 is input to the note event processing unit 31, the velocity signal s312 input to the amplifier 34, the integer part Pt_r [n] of the delay time input to the delay circuit 36 according to the pitch, the decimal part string length delay Pt_f [n] of the delay time input to the all-pass filter 37, the cut-off frequency Fc [n] of the low-pass filter 38, the feedback quantity signal s313 input to the amplifier 39, and the resonance value signal s314 input to the envelope generator 42 are set to respective predetermined levels, before sound generation is started.

When the sound generation start signal s311 is input to the wave reading unit 32, output data s34 corresponding to the predetermined velocity signal s312 is supplied to the closed loop circuit, and sound generation is started in accordance with the set tone change and the delay time.

Thereafter, with the note-off signal s13*a*5 at the note, the feedback quantity signal s313 corresponding to the predetermined release (lingering sound) ratio is supplied to the amplifier 39, and the process changes to a sound deadening operation.

In the key-pressing state and the damper-off state, the feedback quantity signal s314 supplied to the envelope generator 42 is set to a value in accordance with the delay quantity at the delay circuit 36 and the all-pass filter 37.

By contrast, in the non-key-pressing state and the damper-on state, the feedback quantity signal s314 supplied to the envelope generator 42 is set to a value in accordance with the sound volume in release (lingering sound).

As control for the feedback quantity signal s314 supplied to the envelope generator 42, the feedback quantity signal s314 is set smaller in the non-key-pressing state and the damper-on state, the sound is attenuated early, and resonance is relatively small.

In addition, in the non-key-pressing state and in the damper-off state, that is, in a state in which the damper pedal 12 is trodden on, a series of parameters in note-on described above are set in accordance with the damper-on/off signal s13*a*9. However, in the operation, no sound generation start signal s311 is transmitted to the waveform reading unit 32, and no output data s34 is input to the adder 35 via the waveform reading unit 32 and the amplifier 34.

In addition, in the key-pressing state and the damper-off state, input of the string sound output data s68*a* and input of the stroke sound output data s68*b* excite the closed loop circuit including the delay circuit 36, the all-pass filter 37, the low-pass filter 38, the amplifier 39, the amplifier 43, and the adder 41, and resonance sound is generated.

The string sound model channels 63A to 63C are arranged for three strings per one channel for a note of the piano as described above. In the case of adopting dynamic assignment, the channels are fixed to three strings, and the processing operation of the output data (s63) of all the channels are unified. This structure simplifies the hardware circuit structure, removes the necessity for dynamic change of the string structure in the processing program structure, and has merits.

This respect is the same as the reason why the processing operation is unified also in input of stroke sound output data that is originally unnecessary, when only sound source processing of the register limited to one octave of the notes of the lowest sound is not performed in the present embodiment.

In the case of unifying the channel structure of each string model to three string models, when the three string models are assigned to the note of the region of two strings or one string, sound generation may be controlled at the stage of processing to start output of excitation signal data. As another example, easy management is possible by adopting the setting of removing minute musical intervals indicating musical intervals (unison (detune)) of the string.

In addition, the structure is not limited thereto, for example, in the case where the string models for 88 notes are prepared to execute static assignment to assign each of the notes in a fixed manner.

When the present invention is explained with a more specific example, in the case where any first key included in the keyboard 11 and excluded from keys included in one octave of the lowest register is pressed while the damper pedal 12 is trodden on, the first output data from the first channel corresponding to the first key is input to 12 low register channels (21-01 to 21-12) corresponding to one octave of the lowest register.

In this operation, excitation signal data (low register excitation signal data) is input to none of low register channels corresponding to one octave of the lowest register. Specifically, the waveform reading unit 32 included in each of the 12 low register channels does not read excitation signal data (low register excitation signal data) from the excitation signal waveform memory 61.

This is because, by treading on the damper pedal 12, the 12 low register channels corresponding to the octave of the lowest register are only used to generate sound as resonance string of the pressed first key, no key included in the octave of the lowest register is pressed, and the 12 low register channels are not used for generating sound in accordance with key-pressing of a key included in the lowest register.

In the embodiment of the present invention, output data from each of the 12 low register channels and output data from the channel corresponding to the pressed first key are added (merged) with the adder 22 to generate musical sound data corresponding to the pressed first key and including resonance sound in damper-off.

In this state, when any second key included in the keyboard 11 and included in the octave of the lowest register is pressed when the damper pedal 12 is trodden on, output data from the second channel corresponding to the second key is input to the 11 low register channels excluding the second channel in the 12 low register channels corresponding to the octave of the lowest register, and output data from the 11 low register channels and the output data from the second channel are added (merged) with the adder 22 to generate musical sound data corresponding to the pressed second key and resonance sound in damper-off.

In this case, the waveform reading unit 32 corresponding to the second channel serving as the low register channel reads out excitation signal data (low register excitation signal data) from the excitation signal waveform memory 61. By contrast, the waveform reading unit 32 included in each of the other 11 low register channels reads out no excitation signal data (low register excitation signal data) from the excitation signal waveform memory 61.

Figure 5:
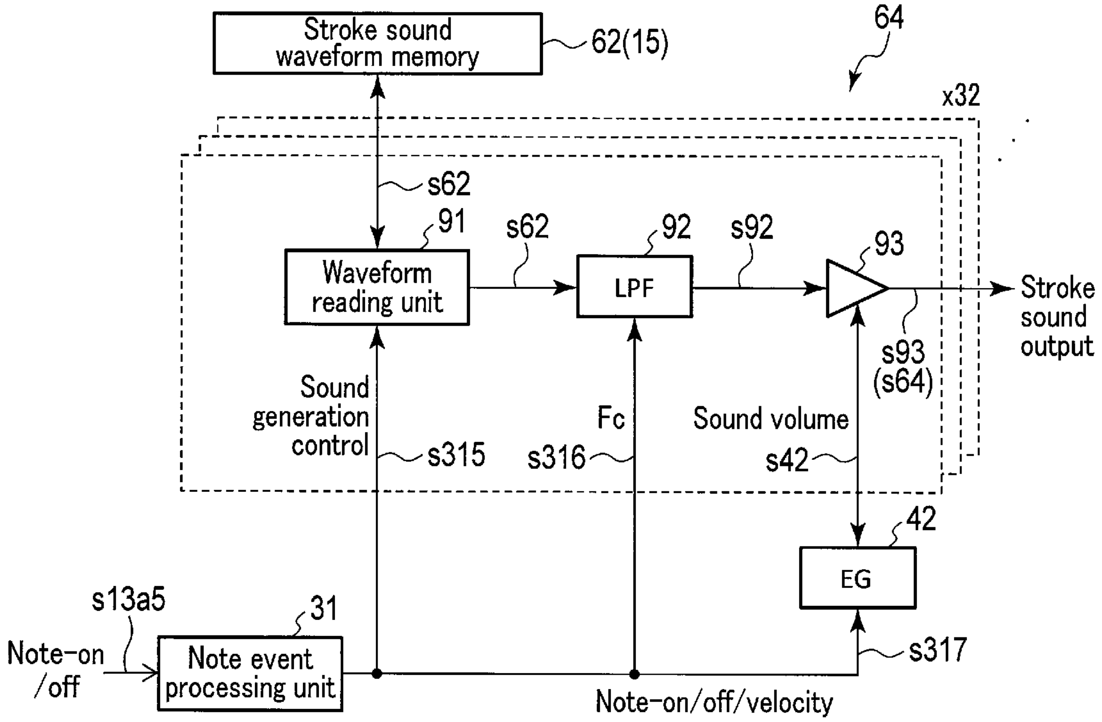
FIG. 5 is a block diagram mainly showing the detailed circuit configuration of a stroke sound generating channel according to the embodiment.

FIG. 5 is a block diagram mainly illustrating the detailed circuit configuration of the stroke sound generation channels 64 of FIG. 3. The stroke sound generation channels 64 include signal generation circuits of 32 channels by correspondence to the dynamic assignment method.

The following is an explanation of one of the stroke sound generation channels 64 as an example.

The note event processing unit 31 is supplied with the note-on/off signal s13*a*5 from the CPU 13A, and transmits a sound generation control signal s315 to a waveform reading unit 91, a signal s317 instructing note-on/off and velocity to the envelope generator (EG) 42, and a signal s316 instructing a cut-off frequency Fc corresponding to the velocity to the low-pass filter (LPF) 92.

The waveform reading unit 91 that has received the sound generation control signal s315 from the note event processing unit 31 reads out the signal data s62 provided from the stroke sound waveform memory 62 (ROM 15) storing the stroke sound signal data s62 as the PCM sound source, and outputs the signal data s62 to the low-pass filter 92.

The low-pass filter 92 causes a component of the stroke sound signal data s62 on the lower pitch side than the cut-off frequency Fc provided from the note event processing unit 31 to pass through the low-pass filter 92. In this manner, the low-pass filter 92 provides the stroke sound signal data s62 with change in tone corresponding to the velocity, and outputs the stroke sound signal data s62 as signal s92 to an amplifier 93.

The amplifier 93 executes sound volume adjustment processing on the basis of the signal s42 provided from the envelope generator 42 and indicating the sound volume according to the stage of ADSR changing with a lapse of time in accordance with the velocity from the note event processing unit 31, and outputs processed stroke sound channel output data s93 (s64) to the subsequent adder 65B.

As illustrated also in FIG. 3, the stroke sound channel output data s64 of 32 channels at most are synthesized and united with the adder 65B, and output to the adder 69 via the amplifier 66B, and also output to the stroke sound model channel 63 side dealing with a string sound musical sound signal via the amplifier 68B.

Figure 6:
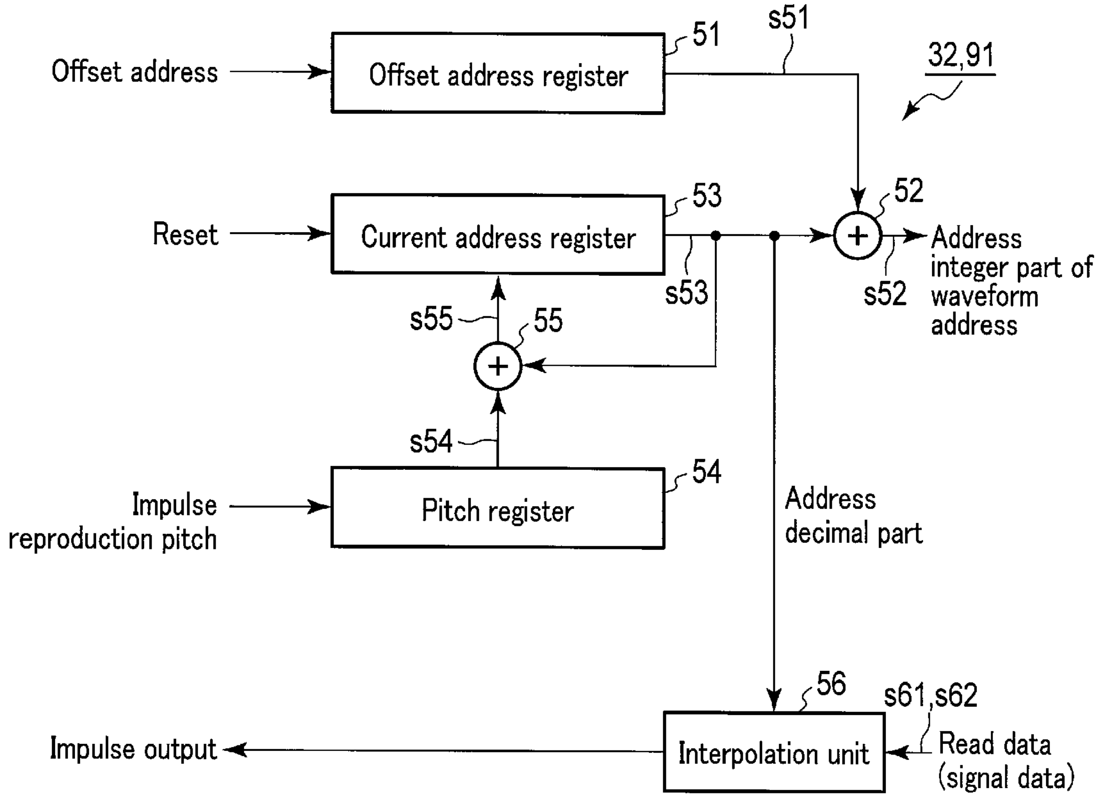
FIG. 6 is a block diagram showing the circuit configuration of a waveform reading unit according to the embodiment.

FIG. 6 is a block diagram illustrating a common circuit configuration of the waveform reading unit 32 reading string sound excitation signal data s61 in the string sound model channel 63 of FIG. 4 and the waveform reading unit 91 reading stroke sound signal data s62 in the stroke sound generation channel 64 of FIG. 5.

When key-pressing occurs in the keyboard unit 11, an offset address indicating a head address corresponding to the note number for which sound is to be generated and the velocity value is retained with an offset address register 51. The retained details s51 of the offset address register 51 is output to the adder 52.

By contrast, a count value s53 of a current address counter 53 that is reset to "0" at the initial stage of sound generation is output to the adder 52, an interpolation unit 56, and the adder 55.

The current address counter 53 serves as a counter successively increasing the count value with a result s55 of addition of a retained value s54 of a pitch register 54 retaining an impulse reproduction pitch and the count value s53 thereof with the adder 55.

An impulse reproduction pitch serving as the set value of the pitch register 54 has a value "1.0" when the sampling rate of signal data in the excitation signal waveform memory 61 or the stroke sound waveform memory 62 agrees with the string model in ordinary cases. By contrast, a value acquired by addition or subtraction to or from the value "1.0" is provided as the impulse reproduction pitch when the pitch is changed by master tuning, stretch tuning, or temperament.

The output (the integer part of the address) s52 of the adder 52 adding the offset address s51 from the offset address register 51 to the current address s53 from the current address counter 53 is output as the read address to the excitation signal waveform memory 61 (or the stroke sound waveform memory 62), and corresponding string sound excitation signal data s61 (or stroke sound signal data s62) is read out from the excitation signal waveform memory 61 (or the stroke sound waveform memory 62).

The read signal data s61 (or s62) is subjected to interpolation with the interpolation unit 56 in accordance with the decimal part of the address output from the current address counter 53 and corresponding to the pitch, and thereafter output as an impulse output.

Figure 7:
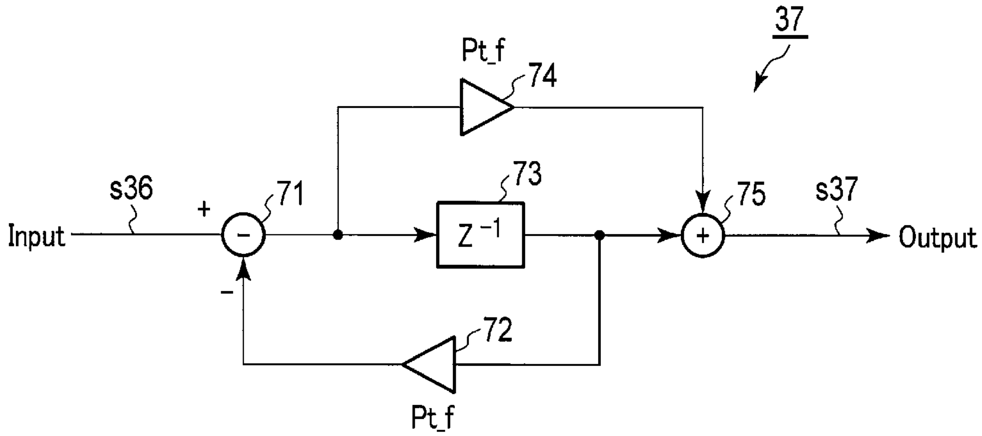
FIG. 7 is a block diagram showing the detailed circuit configuration of an all-pass filter in FIG. 4 according to the embodiment.

FIG. 7 is a block diagram illustrating the detailed circuit configuration of the all-pass filter 37 of FIG. 4. The output s36 from the delay circuit 36 of the previous stage is input to a subtracter 71. The subtracter 71 executes subtraction using waveform data of the previous sampling cycle output from the amplifier 72 as the subtrahend, and outputs output data serving as a difference therebetween to a delay retaining unit 73 and an amplifier 74. The amplifier 74 outputs output data attenuated according to the string length delay Pt_f to the adder 75.

The delay retaining unit 73 retains the transmitted output data, and outputs the output data with a delay for one sampling cycle (Z−1) to the amplifier 72 and the adder 75. The amplifier 72 outputs the output data attenuated in accordance with the string length delay Pt_f as the subtrahend to the subtracter 71. The sum output of the adder 75 is transmitted to the low-pass filter 38 of the subsequent stage, as output data s37 delayed by the time (time for one wavelength) determined in accordance with the input note number information (pitch information), together with the delay operation in the delay circuit 36 at the previous stage.

Figure 8:
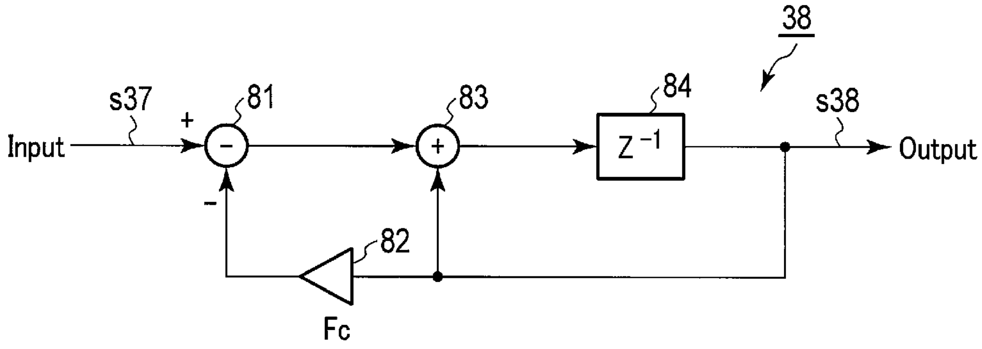
FIG. 8 is a block diagram illustrating the detailed circuit configuration of a low-pass filter in FIG. 4 according to the embodiment.

FIG. 8 is a block diagram illustrating the detailed circuit configuration of the low-pass filter 38 of FIG. 4. The delayed output data s37 from the all-pass filter 37 of the previous stage is input to the subtracter 81. The subtracter 81 is supplied with the output data output from the amplifier 82 and equal to or larger than the cut-off frequency Fc, as the subtrahend, and the low-register side output data smaller than the cut-off frequency Fc is calculated as a difference therebetween and output to an adder 83.

The adder 83 is also supplied with the output data of the previous sampling cycle output from a delay retaining unit 84, and output data serving as the sum thereof is output to the delay retaining unit 84. The delay retaining unit 84 retains output data transmitted from the adder 83 and delays the output data by one sampling cycle (Z−1) to generate output data s38 of the low-pass filter 39. The delay retaining unit 84 also outputs the output data s38 to the amplifier 82 and the adder 83.

As a result, the low-pass filter 83 causes waveform data on the lower register side than the wide-register attenuation cut-off frequency Fc set for the frequency of the string length to pass therethrough, and outputs the waveform data to the amplifier 39 and the delay retaining unit 40 of the subsequent stage.

In the closed loop circuit, because the removing capability at the low-pass filter 38 is enhanced by repeated passage of the output data, a frequency of a relatively high value is generally adopted as the cut-off frequency Fc supplied to the amplifier 82.

[Operations]

The following is an explanation of operations according to the embodiment.

Figure 9:
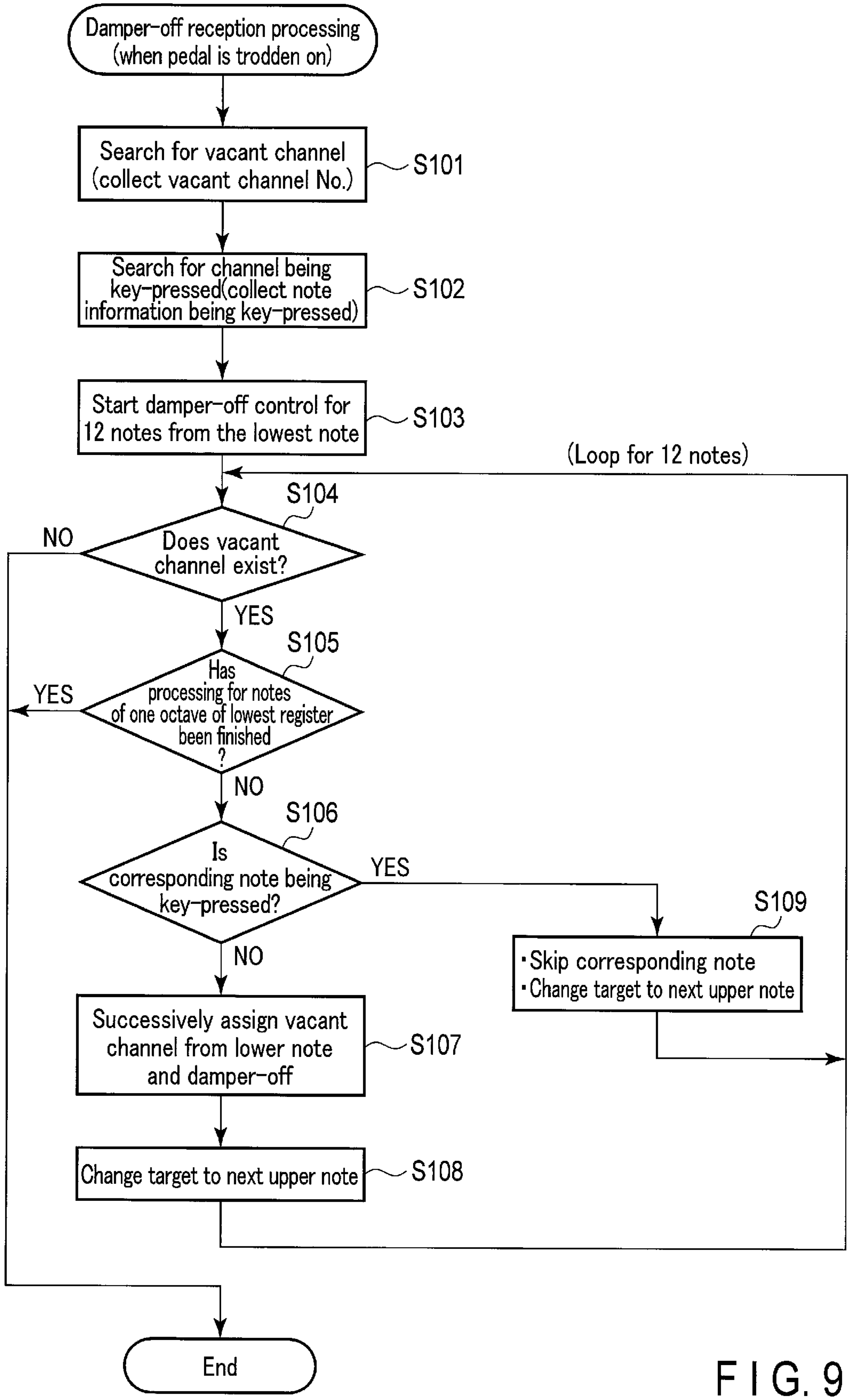
FIG. 9 is a flowchart illustrating the details of the process performed with a sound source DSP when a damper-off signal is received according to the embodiment.

FIG. 9 is a flowchart illustrating the processing details in the case where the damper-off signal s12 is received by the CPU 13A and the CPU 13A outputs a various signal to instruct damper-off for 12 notes for the octave of the lowest register to the note event processing unit 31.

At the beginning of the processing, the CPU 13A searches for a channel number serving as a vacant channel in the string sound model channels 63 for 32 channels according to the playing state at the point in time (Step S101).

In addition to the channel number serving as a vacant channel, other channels may be regarded as vacant channels and searched for, such as a channel in which the wave height value of the channel output data s63 indicating the sound pressure of the musical sound being generated does not reach a predetermined threshold, in channels generating musical sound at the point in time, and a channel in which the wave height value of the channel output data s63 is lower than a predetermined rate in comparison with the wave height of the channel output data s63 indicating the sound pressure of the highest musical sound at the point in time.

Thereafter, the CPU 13A collects information of the number of the note key of which is being pressed in the keyboard unit 11 at the point in time by retreating the use state in the string sound model channel 63 (Step S102).

Thereafter, the CPU 13A starts damper-off control for 12 notes for the octave, that is, A0 to G1 #, of the lowest register (Step S103).

Thereafter, the CPU 13A determines whether the 32 channels include a vacant channel generating no musical sound at the point in time (Step S104).

At this step, when it is determined that a vacant channel exists (YES at Step S104), thereafter the CPU 13A determines whether processing for 12 notes of the octave, that is, A0 to G1 # of the lowest register has been finished (Step S105).

When it is determined that the processing for the octave of the lowest register has not been finished (NO at Step S105), first, the CPU 13A selects the lowest A0 note in them as the determination target, and determines whether the note is being key-pressed in the keyboard unit 11 (Step S106).

When it is determined that the note is not being key-pressed (NO at Step S106), the CPU 13A assigns the note to the vacant channel, and starts processing of performing damper-off for the channel and generating resonance sound of the musical sound (Step S107).

Thereafter, the CPU 13A performs setting to change the processing target to the next upper note (Step S108), the CPU 13A returns to the processing from Step S104.

At Step S106, when it is determined that the note is being key-pressed (YES at Step S106), it is regarded that the damper-off processing for the note has already been performed. The CPU 13A skips additional processing for the note, performs setting to change the processing target to the next upper note (Step S109), and thereafter returns to the processing from Step S104.

As described above, the processing at Steps S107 and S108 or the processing at Step S109 is executed for 12 notes of the octave of the lowest register.

When it is determined at Step S104 that no vacant channel generating no musical sound exists (NO at Step S104) or when it is determined at Step S105 that the processing for the octave of the lowest register has been finished (YES at Step S105), the CPU 13A ends the processing in FIG. 9 at the point in time.

Figure 10:
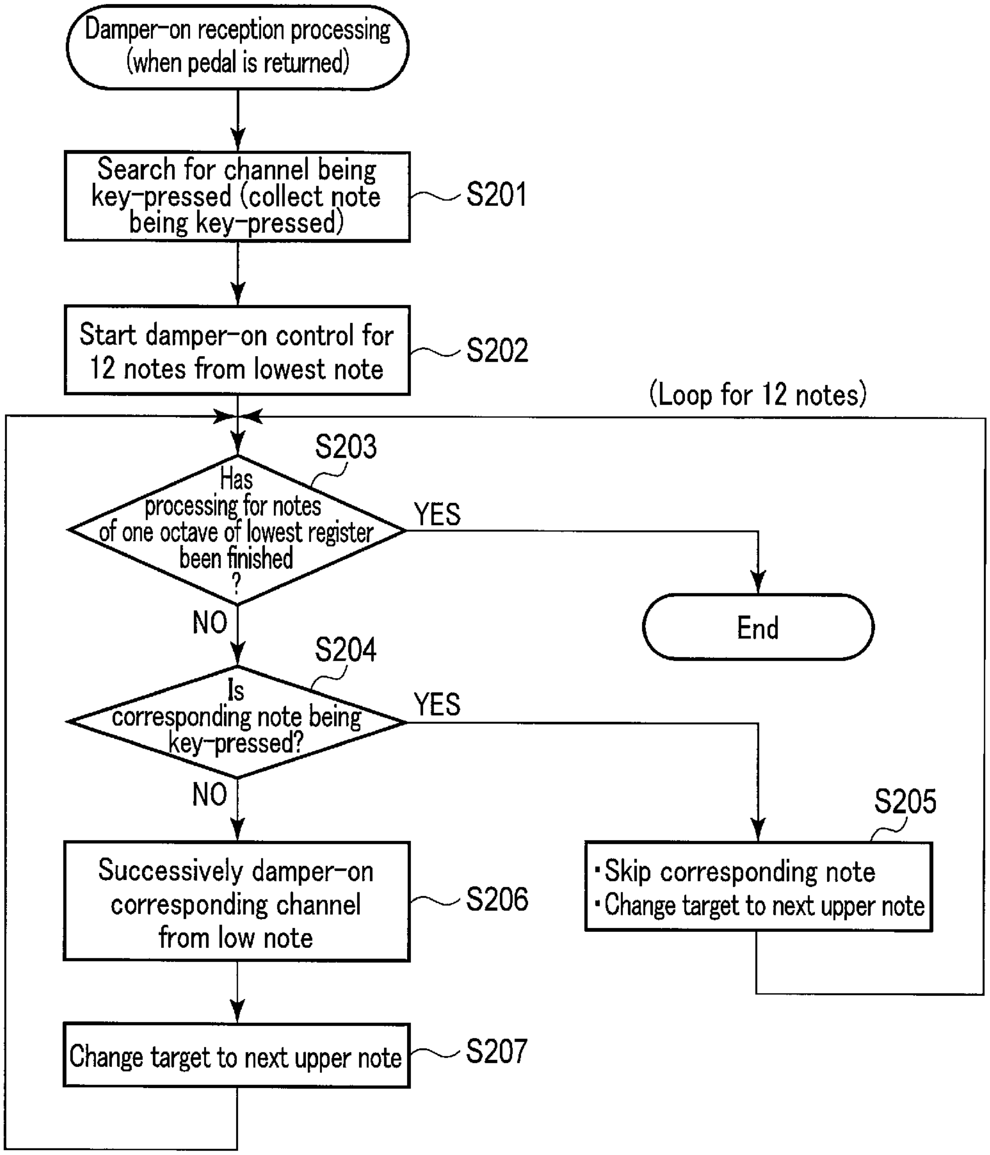
FIG. 10 is a flowchart illustrating the details of the process performed with the sound source DSP when a damper-on signal is received according to the embodiment.

FIG. 10 is a flowchart illustrating the processing details in the case where the damper pedal 12 is returned from the trodden state, the damper-on signal s12 is received by the CPU 13A, and the CPU 13A outputs a various signal to instruct damper-on to the note event processing unit 31.

At the beginning of processing, the CPU 13A collects information of the number of the note being key-pressed at the point in time by searching for the use state in the string sound model channel 63 (Step S201).

Thereafter, the CPU 13A starts damper-on control for 12 notes of the octave, that is, A0 to G1 # of the lowest register (Step S202).

Thereafter, it is determined whether processing for 12 notes of the octave, that is, A0 to G1 # of the lowest register has been finished from the state in which one of the 12 notes of the lowest register, the lowest note A0 in them first, is selected (Step S203).

When it is determined that the processing for the octave of the lowest register has not been finished (NO at Step S203), the CPU 13A determines whether the note of the lowest register selected at the point in time is being key-pressed (Step S204).

When the note is being key-pressed in the keyboard unit 11 (YES at Step S204), the CPU 13A skips additional processing for the note, performs setting to change the processing target to the next upper note (Step S205), and thereafter returns to the processing from Step S203.

As described above, for each of the 12 notes for the octave, that is, A0 to G1 # of the lowest register, when the note is being key-pressed, the processing at Step S205 is repeatedly execute to maintain the damper-off state.

At Step S204, when the note in the 12 notes of the lowest register is not being pressed in the keyboard unit 11 (NO at Step S204), the CPU 13A successively transmits a damper-on signal to the corresponding string sound model channel 63 from the note of the lowest register to execute processing of attenuating the resonance sound (Step S206).

Thereafter, the CPU 13A performs setting to change the processing target to the next upper note (Step S207), and thereafter returns to the processing from Step S203.

At Step S203, when it is determined that the processing for the octave of the lowest register has been finished (YES at Step S107), the CPU 13A ends the processing in FIG. 10 at the point in time.

The following is an explanation of the structure of performing addition synthesis of the string sound waveform data and the stroke sound waveform data, with reference to FIG. 11 to FIG. 14.

Figure 11:
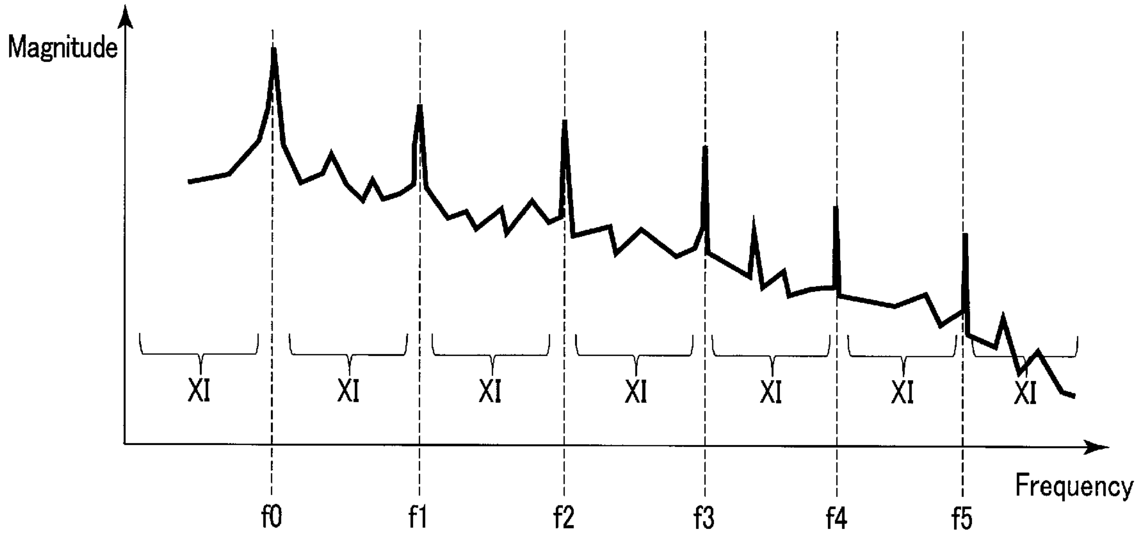
FIG. 11 is a diagram illustrating a frequency spectrum of an acoustic piano according to the embodiment.

FIG. 11 is a diagram illustrating a frequency spectrum of musical sound generated when a note of pitch f0 is key-pressed. As illustrated, the frequency spectrum is formed of string sound formed of a peak-like basic sound f0 and harmonic tones f1, f2, . . . , thereof connected thereto, and stroke sound generated in gap portions XI, XI, . . . of the peak-like string sound. In the present embodiment, the signal data of the waveform of the string sound waveform and the signal data of the waveform of the stroke sound are generated separately and subjected to addition synthesis to generate more natural piano musical sound data.

Figure 12:
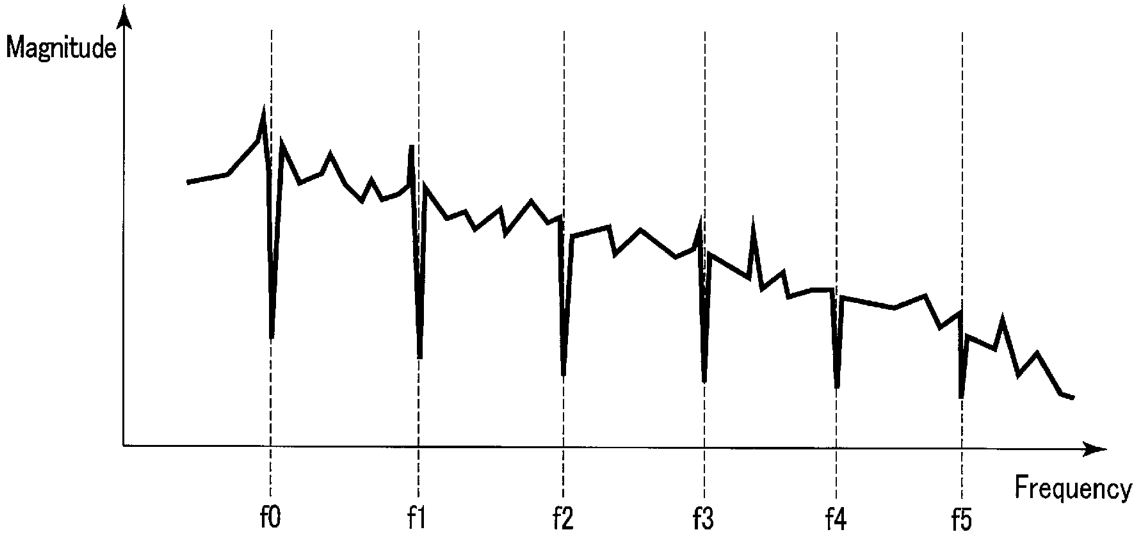
FIG. 12 is a diagram illustrating a frequency spectrum of stroke sound acquired by removing a waveform component of string sound from the frequency spectrum of FIG. 11 according to the embodiment.

FIG. 12 is a diagram illustrating a frequency spectrum of stroke sound acquired by removing waveform components of the string sound from the frequency spectrum of FIG. 11. The stroke sound signal data having such a waveform is stored in the stroke sound waveform memory 62, and read out with the waveform reading unit 91 in the stroke sound generation channel 64 as illustrated in FIG. 5.

Figure 13:
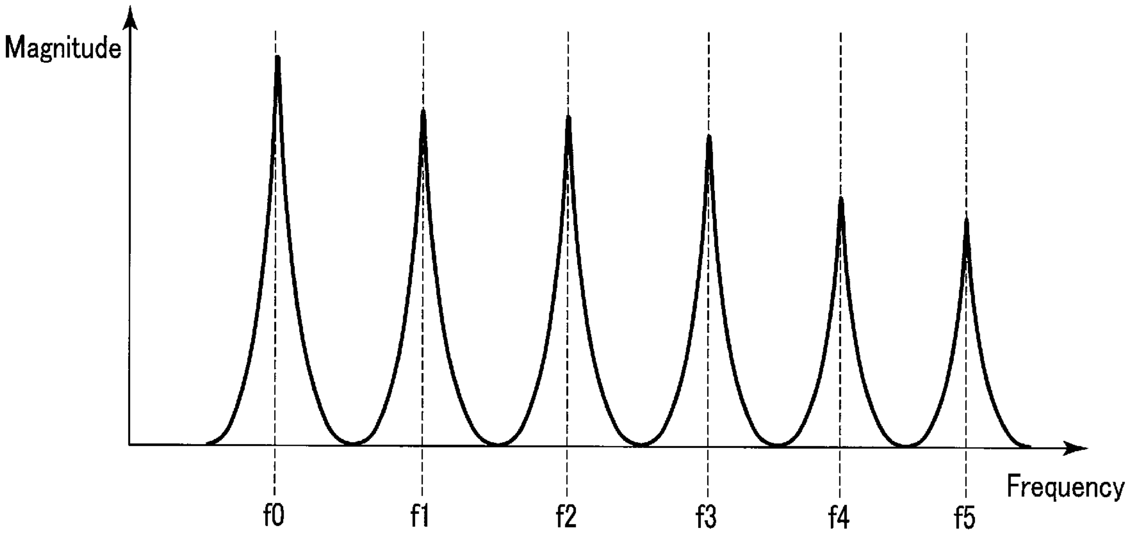
FIG. 13 is a diagram illustrating a frequency spectrum of string sound according to the embodiment.

By contrast, as illustrated in FIG. 13, the string sound signal data having a frequency spectrum formed of a peak-like basic sound f0 and harmonic tones f1, f2, . . . thereof connected thereto is stored in the excitation signal waveform memory 61, and read out with the waveform reading unit 32 in the string sound model channel 63 as illustrated in FIG. 4.

Figure 14:
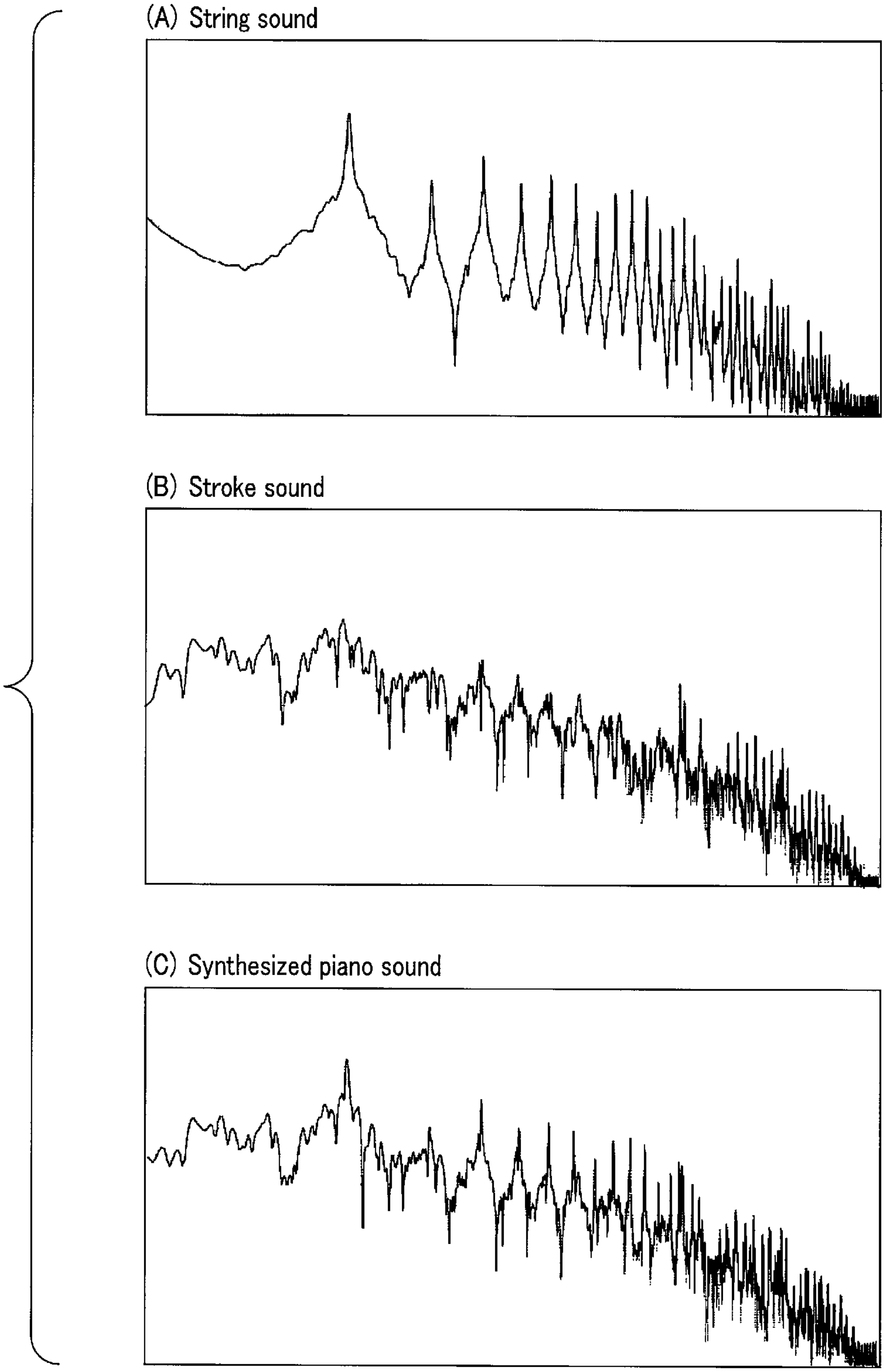
FIG. 14 is a diagram illustrating a specific example of waveforms forming piano musical sound and a waveform of piano musical sound acquired by addition synthesis according to the embodiment.

FIG. 14 is a diagram illustrating a specific example of each of waveforms forming piano musical sound and the waveform of addition-synthesized piano musical sound. By performing addition synthesis on string sound output data s66*a* having the frequency spectrum illustrated in FIG. 14 (A) and stroke sound output data s66*b* having the frequency spectrum as illustrated in FIG. 14 (B), it is possible to generate musical sound data s69 very close to musical sound of an acoustic piano and similar to natural piano sound as illustrated in FIG. 14 (C).

The following is an explanation of an addition ratio at the time when the string sound and the stroke sound are actually added.

While the string sound is sound generated by physical basic characteristics of strings of a piano, the stroke sound defined in the present embodiment includes components of other sound excluding components of pure string sound, and includes various elements, such as sound of collision generated when the hammer collides with string inside the piano by key-pressing, operating sound of the hammer, key-stroke sound by a finger of the piano player, and sound generated when the key hits on the stopper and stops, as described above.

The addition ratio of the string sound to the stroke sound is changed according to the sound to be synthesized, the type of the piano, and the supposed distance from the piano, and the like.

For example, when the piano performance is listened from a position closer to the piano, larger stroke sound is heard. For this reason, when the distance from the piano is set small, the addition ratio of the stroke sound is increased. By contrast, when setting is made on the assumption that the piano performance is listened from a distant place, the addition ratio of the stroke sound is decreased.

In addition, for example, in the case of generating resonance sound in a state in which the damper pedal 12 is not trodden on, that is, in the case of generating resonance sound formed of only string resonance without damper resonance, the addition ratio of the stroke sound is increased on the assumption that the resonance sound is close to pure sound. By contrast, in a state in which the damper pedal 12 is trodden on, damper resonance is generated, and resonance sound excited with the stroke sound and having a wide frequency band is generated as the whole resonance sound. For this reason, setting is performed to increase the addition ratio of the stroke sound.

While actual string sound of an acoustic piano is amplified with a resonance board connected with the bridge and output to the outside of the piano, a resonance operation of string is mainly generated by resonance of strings through the bridge. For this reason, unlike string sound resonating on the resonance board, the resonance sound includes more stroke sound components, ad the component ratio differs also according to the type and/or the model of the piano.

For this reason, the present embodiment has the structure in which the component of resonance bridge transmission sound can be synthesized with a ratio different from the synthesized piano sound.

As described above, setting may be performed with the amplification ratio (attenuation ratio) changed between the amplifiers according to the type and/or the model of the piano and/or the user's likings, to enable adjustment of the sound quality of the generated resonance sound.

Lastly, a principle structure of the damper resonance serving as resonance sound generated when the damper pedal 12 is trodden on will be explained again.

Figure 15:
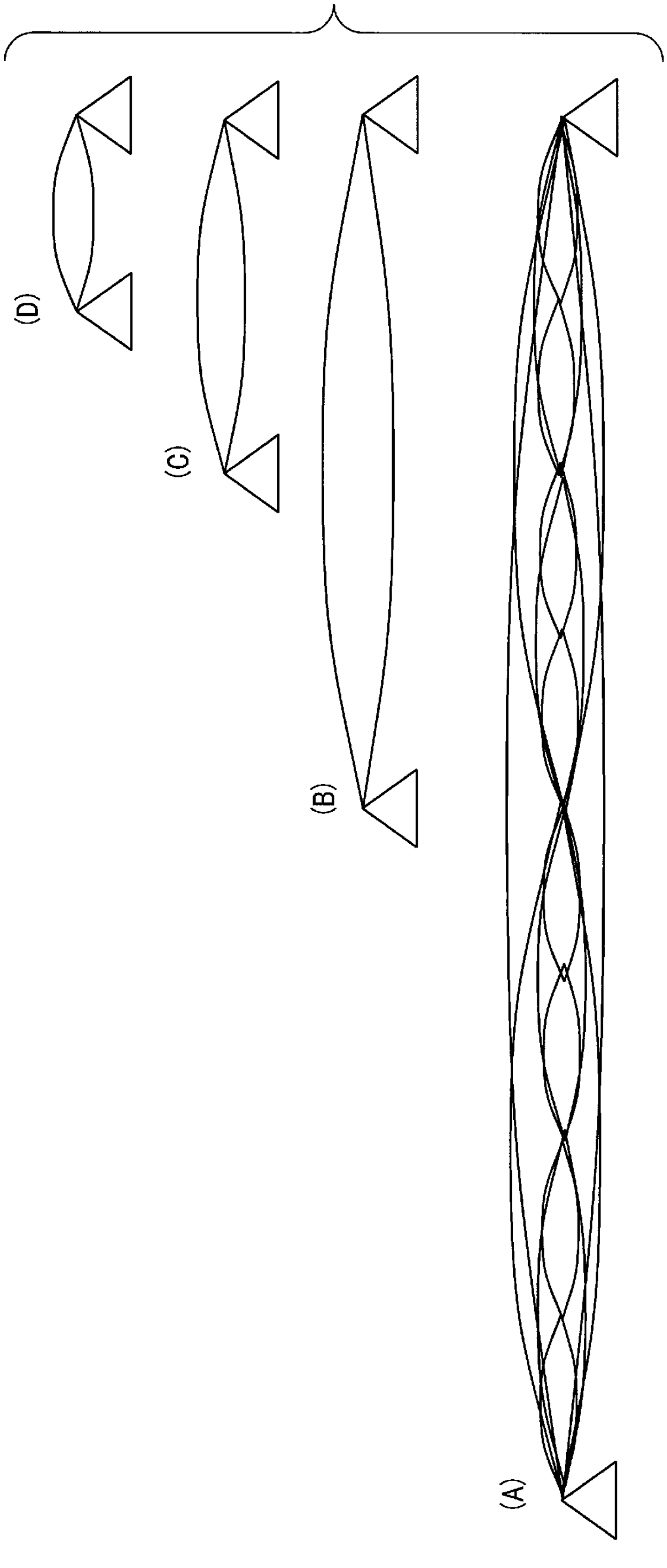
FIG. 15 is a diagram illustrating relation between waveforms of basic sound and harmonic tone according to the embodiment.

FIG. 15 illustrates relation between waveforms of sound. FIG. 15 (A) illustrates basic sound. FIG. 15 (B) illustrates a harmonic tone higher than the basic sound of FIG. 15 (A) by one octave, FIG. 15 (C) illustrates a harmonic tone higher than the basic sound of FIG. 15 (A) by two octaves, and FIG. 15 (D) illustrates a harmonic tone higher than the basic sound of FIG. 15 (A) by three octaves.

For example, with respect to harmonic tones of the strings with the same note number, such as C0, C1, C2, . . . , having relation distant from the frequency of the basic sound by one or more octaves, the longest string includes all the harmonic tones. For this reason, when the damper pedal 12 is trodden on, resonance sound including harmonic sound of all the registers can be generated by generating resonance sound with 12 notes of the octave of the lowest register.

As described in detail above, the present embodiment enables generation of good damper resonance.

The present embodiment has the structure of generating damper resonance sound on the basis of a plurality of successive notes of the lowest register, and enables acquisition of more minute damper resonance sound including their basic sounds and harmonic tones.

In this respect, in particular, the present embodiment has the structure of generating damper resonance sound for 12 notes of the octave of the lowest register, and enables generation of resonance sound including all the pitches and sufficiently similar to the original damper resonance sound with their basic sounds and harmonic tones.

In addition, the present embodiment has the structure of feeding back the string sound musical sound signal and the stroke sound musical sound signal, and enables generation of more natural musical sound of stringed instruments and/or percussion instruments, including an acoustic piano.

When the notes of the lowest register are assigned to the string sound model channels, the notes are successively assigned to vacant channels from the note of the lower side including more harmonic sounds within the audible frequency range, and this structure enables efficient assignment of channels.

Although it has been explained in the present embodiment, in addition to vacant channels, channels generating sound less than a preset sound pressure may be regarded as virtual vacant channels and used as targets of assigning notes of the lowest register. This structure enables effective use of sound source channels in consideration of the masking effect.

In addition, the present embodiment has the structure in which the channel generating sound and corresponding to key-pressing at the point in time is not newly assigned to a note, and enables efficient assignment processing of channels.

In addition, the present embodiment has the structure in which the note of the lowest register in the key-pressing state is regarded as a note for which damper-off processing has already been executed, and assignment processing to a channel for the note is skipped. This structure enables efficient assignment processing of channels.

In addition, the present embodiment includes a plurality of stroke sound generation channels, in addition to a plurality of string sound generation channels, and string sound and stroke sound are subjected to addition synthesis to generate a musical sound signal. This structure enables not only faithful reproduction of musical sound of stringed and percussion instruments, such as an acoustic piano, but also enjoyment of performance with settings with higher degree of freedom, such as setting of musical sound to be generated in consideration of the model of the musical instrument, the position of the musical instrument and a distance and positional relation of the person listening the musical sound thereof, and the sound that the listener likes.

In this case, the stroke sound musical sound signal does not have peak characteristics with octave cycles like the string sound musical sound signal, but is provided as a waveform fluctuating between the peak characteristics. This structure enables easy dealing, for example, the ratio and/or characteristics are set different between the string sound and the stroke sound.

In addition, in the present embodiment, a plurality of channels of the sound source generating string sound are provided as common structures. This structure enables efficient assignment of channels even in the case of generating musical sound of an acoustic piano in which the number of string sounds generated per channel differs according to the register of the note.

In addition, the present embodiment has the structure in which the musical sound signal of the string sound is subjected to negative feedback in a closed loop circuit. This structure enables efficient generation of resonance sound on a small circuit scale.

In addition, in the present embodiment, in each of the closed loop circuits, a musical sound signal of the string sound acquired by subtracting the output of the closed loop circuit of the channel from an addition result of musical sound signals of the string sounds is subjected to negative feedback. This structure enables generation of resonance sound while suppressing abnormal oscillation, without increasing the circuit scale.

As described above, the present embodiment illustrates the case of being applied to an electronic keyboard musical instrument, but the present invention is not limited to a musical instrument or a specific model.

The invention of the present application is not limited to the embodiment described above, but can be variously modified in the implementation stage without departing from the scope of the invention. In addition, the embodiments may be suitably implemented in combination, in which case a combined effect is obtained. Furthermore, inventions in various stages are included in the above-described embodiments, and various inventions can be extracted by a combination selected from a plurality of the disclosed configuration requirements. For example, even if some configuration requirements are removed from all of the configuration requirements shown in the embodiments, the problem described in the column of the problem to be solved by the invention can be solved, and if an effect described in the column of the effect of the invention is obtained, a configuration from which this configuration requirement is removed can be extracted as an invention.

What is claimed is:

1. An electronic keyboard musical instrument comprising:

a keyboard including a first key and a plurality of low-register keys on a low register side;

a processor; and a sound source, wherein the sound source is configured to, in response to detection of key-pressing of the first key in damper-off detection by the processor, execute processing of:

inputting first excitation signal data corresponding to the first key to a first channel which corresponds to the first key, inputting first channel output data which is output from the first channel in response to input of the first excitation signal data to each of low-register channels corresponding to the respective low-register keys, and outputting musical sound data which is generated based on: respective pieces of low-register channel output data which is output from the respective low-register channels in response to the input of the first channel output data and the first channel output data output from the first channel, as musical sound data corresponding to the first key, wherein the low-register keys includes at least low-register keys for one octave.

2. The electronic keyboard musical instrument according to claim 1, wherein the sound source is further configured to, in response to detection of key-pressing of the first key in the damper-off detection by the processor, input no pieces of low-register excitation signal data corresponding to the respective low-register keys to the respective low-register channels.

3. The electronic keyboard musical instrument according to claim 1, wherein the sound source is further configured to, in response to detection of key-pressing of the first key at the time when no damper-off is detected by the processor, execute processing of:

inputting the first excitation signal data corresponding to the first key to the first channel which corresponds to the first key, and outputting the first channel output data which is output from the first channel in response to the input of the first excitation signal data, as the musical sound data corresponding to the first key, without inputting the first channel output data to each of the low-register channels corresponding to the respective low-register keys.

4. The electronic keyboard musical instrument according to claim 1, wherein the sound source is configured to, in response to the detection of key-pressing of the first key in damper-off detection by the processor, execute processing of:

the inputting the first excitation signal data to the first channel, and inputting stroke sound signal data of stroke sound complementing a frequency component between a basic sound component and a harmonic tone component corresponding to the first key to the first channel.

5. The electronic keyboard musical instrument according to claim 1, wherein the sound source is further configured to, in response to detection of key-pressing of a second key in the low-register keys in damper-off detection by the processor, execute processing of:

inputting second excitation signal data corresponding to the second key to a second channel which corresponds to the second key, inputting second channel output data to be output from the second channel in response to input of the second excitation signal data to each of the low-register channels corresponding to the respective low-register keys of the low-register keys excluding the second key, and outputting musical sound data which is generated based: on respective pieces of low-register channel output data which is output from the respective low-register channels in response to the input of the second channel output data and the second channel output data to be output from the second channel, as musical sound data corresponding to the second key.

6. The electronic keyboard musical instrument according to claim 1, further comprising:

a damper pedal, wherein the processor is configured to detect the damper-off in response to treading of the damper pedal by the user.

7. A method of generating musical sound, comprising:

causing a sound source to, in response to detection of key-pressing of a first key in damper-off detection by a processor, execute processing of:

inputting first excitation signal data corresponding to the first key to a first channel which corresponds to the first key;

inputting first channel output data which is output from the first channel in response to input of the first excitation signal data to each of low-register channels corresponding to respective low-register keys;

outputting musical sound data which is generated based on respective pieces of low-register channel output data which is output from the respective low-register channels in response to the input of the first channel output data and the first channel output data output from the first channel, as musical sound data corresponding to the first key; and configuring the low-register keys to include at least low-register keys for one octave.

8. The method according to claim 7, further comprising causing the sound source to, in response to detection of key-pressing of the first key in the damper-off detection by the processor, input no pieces of low-register excitation signal data corresponding to the respective low-register keys to the respective low-register channels.

9. The method according to claim 7, further comprising causing the sound source to, in response to detection of key-pressing of the first key at the time when no damper-off is detected by the processor, execute processing of:

inputting the first excitation signal data corresponding to the first key to the first channel which corresponds to the first key, and outputting the first channel output data which is output from the first channel in response to the input of the first excitation signal data, as the musical sound data corresponding to the first key, without inputting the first channel output data to each of the low-register channels corresponding to the respective low-register keys.

10. The method according to claim 7, further comprising in response to the detection of key-pressing of the first key in damper-off detection by the processor, causing the sound source to execute processing of:

the inputting the first excitation signal data to the first channel, and inputting stroke sound signal data of stroke sound complementing a frequency component between a basic sound component and a harmonic tone component corresponding to the first key to the first channel.

11. The method according to claim 7, further comprising causing the sound source to, in response to detection of key-pressing of a second key in the low-register keys in damper-off detection by the processor, execute processing of:

inputting second excitation signal data corresponding to the second key to a second channel which corresponds to the second key;

inputting second channel output data to be output from the second channel in response to input of the second excitation signal data to each of the low-register channels corresponding to the respective low-register keys of the low-register keys excluding the second key; and outputting musical sound data which is generated based on: respective pieces of low-register channel output data which is output from the respective low-register channels in response to the input of the second channel output data and the second channel output data to be output from the second channel, as musical sound data corresponding to the second key.

12. The method according to claim 7, further comprising causing the processor to execute processing of detecting the damper-off in response to treading of a damper pedal by the user.

* * * * *